Jan. 27, 1948.  V. W. SHERMAN  2,434,966

DEHYDRATION OF LIQUIDS

Filed March 4, 1944

INVENTOR.
VERNON W. SHERMAN
BY
ATTORNEY

Patented Jan. 27, 1948

2,434,966

UNITED STATES PATENT OFFICE 2,434,966

DEHYDRATION OF LIQUIDS

Vernon W. Sherman, Summit, N. J., assignor to Federal Telephone and Radio Corporation, New York, N. Y., a corporation of Delaware Application March 4, 1944, Serial No. 525,062

11 Claims. (Cl. 159—11)

This invention relates to improvements in apparatus for the dehydration of food products by radio frequency energy and more particularly by H. F. energy within a vacuum chamber. The improved apparatus is especially designed for the drying of food products of a fluid consistency such as liquid concentrated fruit pulps or vegetable juices so as to produce a resultant product so reduced in its moisture content as to be suitable for dry packing for soup ingredients and the like and adapted for extended periods of storage without deterioration of its food values and flavor characteristics.

Important features of the present improvements, in its preferred embodiment, comprise an arrangement for the evaporating of water freed from the material under treatment by the action of an alternating electrostatic field in an arrangement wherein the material in a liquid state is deposited upon the surface of rolls or drums to which it adheres, the drums being rotated and forming one of the electrodes of the electrostatic heating means. The rotation of the drums advances the material with relation to coacting electrodes connected in an oscillator circuit for completion of the drying operation after which the dried material adhering to the drum surface is removed by suitable scrapers or knives to be deposited in receiving hoppers. The drums or cylinders may desirably be steam heated thereby to contribute to the drying operation and are enclosed within a suitable chamber from which the atmosphere is continually exhausted thereby to carry off the released moisture.

In accordance with a further feature of the invention a special provision or circuit arrangement is provided so as to establish that the vacuum chamber and the drums and associated supporting parts shall be electrically maintained at substantially zero potential with respect to ground throughout the operation. This desirable arrangement accordingly minimizes the danger to operators and further provision is made in connection therewith to permit of obtaining a substantially uniform and equal voltage distribution across or through the food products adhering to the surface of each roll thereby to permit of maintaining a maximum dehydration rate with relation to each of the rolls without case hardening or burning the surface of the food particles. The possibility of H. F. radiation is also decreased by the above circuit arrangement.

The described and other features and advantages of the present improvements will be more fully understood by reference to the accompanying drawings wherein like reference characters are applied to the corresponding parts in the several views.

Figure 1:
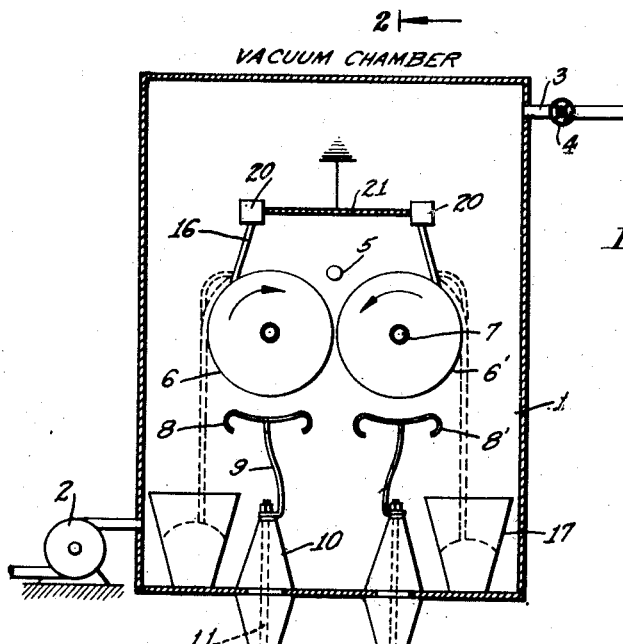
Fig. 1 is a view in vertical cross section showing diagrammatically the improved apparatus of the present invention and circuit arrangement therefor.
Figure 2:
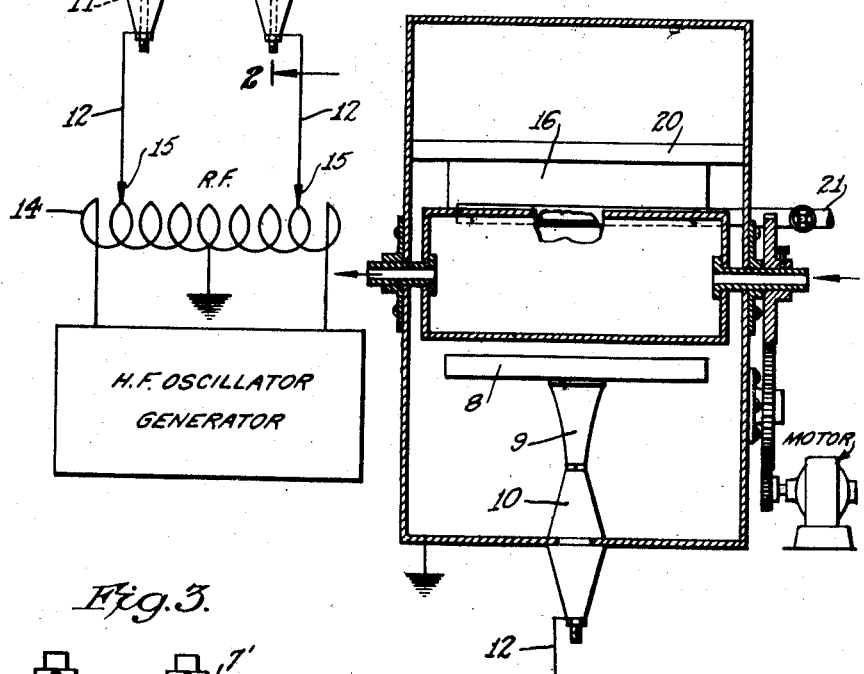
Fig. 2 is a view thereof in vertical section taken at right angles to Fig. 1 on line 2—2 and with the chamber wall removed to expose the interior.
Figure 3:
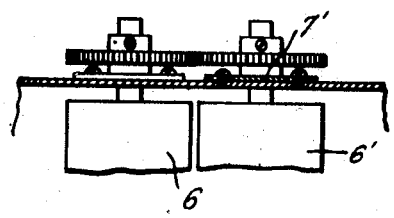
Fig. 3 is a partial plan view with portions in section.

In the construction of the improved apparatus, in its preferred form as illustrated, 1 indicates a suitable vacuum chamber enclosure in which a sub-atmospheric pressure is maintained by an exhaust pump 2 operating in conjunction with an adjustable bleeder opening in connection 3 for maintaining a circulation through the chamber for continuous vapor removal. The liquid food product to be dried is delivered within the chamber through a centrally arranged delivery pipe 5 formed on its under side with a delivery opening or perforations for delivering the liquid product upon the surfaces of suitably journalled and rotated steam heated drums or electrode cylinders 6 and 6'. As best shown in Fig. 2 the electrode cylinders 6 and 6' are journalled on hollow bearing shaft extensions 7 through which steam is admitted and exhausted for continuous heating of the cylinder walls. Through suitable gearing connections the cylinders 6 are rotated in opposite directions, the cylinders being journalled in a horizontal plane at opposite sides of the central vertical axis with their peripheral surfaces in closely spaced parallel relation which spacing may be approximately .05 of an inch. The drums or cylinders 6—6' are slowly rotated by a suitable motor M in any well known manner by reduction gearing connection.

The bearings for the drums 6—6' are desirably of a character to permit of a slight adjustment of the drums toward each other so as to afford a relatively small adjustment in the drum spacing suited to the particular material under treatment; this adjustment as will be understood, is too small to interfere with the driving gear connections. For the purpose the bearing support 7' for one of the drums is secured to the supporting enclosure by screws fitted to slightly elongated slots permitting spacing adjustment. The drums or electrode cylinders 6—6' are slowly rotated in the direction as indicated by arrows and the volume of material or food product adhering to the heated surface thereof is carried downwardly and outwardly to pass over and in close spaced relation to the electrodes 8 and 8' desirably of a form as shown having a curved upper surface substantially concentric with the periphery of the drums. In accordance with the invention these electrodes 8 and 8' are connected as shown to the output leads of a H. F. alternating current generator. They are supported by leads 9 mounted on insulators 10 and connected by conductors 11 passed through and insulated from the bottom wall of the chamber and connected to the output leads 12 of the H. F. generator by means of adjustable connections 15 to the centrally grounded tank coil 14 thereof. The film of food product is electrostatically heated and dried as it moves over the electrodes 8—8' after which it is carried upwardly as a dried product and is removed from the drums by means of scraper blades 16 and drops by gravity into suitable hoppers 17 positioned to receive the processed product. As indicated the scraper blades make close contact with the drums 6—6' and are supported upon bars 20 of good electrical conducting material and these bars are connected by a conductor 21 which is grounded as indicated.

The circuit arrangement as described establishes electrostatic heating fields which are substantially 180° out of phase between each electrode 8 or 8' and its associated drum. The drums are preferably of copper or other high electric conductivity metal and incident to the improved circuit arrangement operate as rotary grounded electrodes in a parallel circuit arrangement wherein the movable system and supporting members are grounded in a manner so as to provide protection to the operator.

This electrical arrangement is further advantageous in that it provides a substantially uniform distribution of the heating fields associated with each electrode and through the food products adhering to the surface of the drums notwithstanding variables that may be introduced by shorting connection between the drums through the food product at the point of its delivery between or upon the drum surfaces.

The adjustable connection of the output leads 12 to the tank coil of the oscillator circuit as diagrammatically shown is of importance in providing for varying the rate of heating by the electrodes whereby they may be accurately controlled to obtain uniform heating action and to compensate for slight spacing variations as may occur between the electrodes and the outer surfaces of the drums. While this type of adjustment is desirable by reason of its simplicity, other provision for adjustment and balancing of the electrostatic heating action may be employed such as tapering of the air gap, or providing a portion of the electrode with a corrugated surface to increase the surface voltage gradient as will be readily understood.

In the drying process as performed by the improved apparatus the frequency of the alternating current energy employed may desirably be, for example, between 10 and 60 megacycles. It is determined in part by the nature of the food product, the original moisture content and the degree of dehydration desired. It is recognized that frequencies in excess of 60 megacycles may be advisable in some applications. The employment of H. F. dielectric heating insures uniform high speed heating of the food product without danger of case hardening. The steam heating of the rolls prevents loss of the radio frequency heat from the product. The vacuum release and discharge of the vapors released by the application of the H. F. energy to the product expedites the process as will be readily understood.

A very small amount of radio frequency energy is required and the cost of the electrical energy as computed with relation to the quantity of water removed is well within economic requirements. The close spacing of the drum surfaces (shown exaggerated in the drawings) with the provision for slight adjustment of the spacing distance provides in drying materials of high viscosity for controlling the thickness of the material layer adhering to the drum surfaces in addition to the control thereof offered by the valve 21 of the delivery pipe 5 controlling the volume as will be readily understood.

Having described my invention, I claim:

1. Electrostatic heating apparatus of the character described comprising an enclosure, electrode drums of high electric conductivity metal suitably journalled therein in closely spaced relation, means for delivering the material to be heated upon the surfaces of and between the electrode drums, an electrode positioned in spaced relation to each of the drums to determine an electrostatic field through the material adhering to the surface of the drums, a high frequency oscillatory generator having its output leads connected to the respective electrodes and means for electrically grounding the drums to minimize the voltage of the drums with respect to earth.

2. Electrostatic heating apparatus of the character described comprising an enclosure, cylindrical drums of high electrical conductivity metal suitably journalled therein in closely spaced relation, means to deliver the material to be heated upon the surfaces of and between the drums, an electrode insulatedly supported in spaced relation to each of the drums to establish an electrostatic heating field through the material adhering to the surface of the drums, a high frequency oscillatory generator having its output leads connected to the respective electrodes and said drums being grounded to minimize the voltage of the drums with respect to earth and to establish parallel circuits for the respective electrodes and means for varying the relative strength of the substantially 180° out of phase electrostatic fields thereof.

3. Electrostatic heating apparatus of the character described comprising an enclosure, cylindrical drums of high electrical conductivity metal suitably journalled therein in closely spaced relation, means for passing steam through the drums for the heating thereof, means to deliver the material to be heated upon the surfaces of and between the drums, an electrode insulatingly supported in spaced relation to the drums to establish the electrostatic heating fields through the material adhering to the surface of the drums, a high frequency oscillatory generator having its output leads connected to the respective electrodes, said drums being grounded to minimize the voltage of the drums with respect to earth and to establish parallel circuits for the respective electrodes and means for varying the relative strength of the substantially 180° out of phase electrostatic fields consisting in adjustably connecting the output leads of the oscillatory generator to the tank coil thereof.

4. Electrostatic heating apparatus of the character described comprising an enclosure, cylindrical drums of high electrical conductivity metal suitably journalled therein in closely spaced relation, means for rotating the drums in opposite directions, means for passing steam through the drums for the heating thereof, means to deliver the material to be heated upon the surfaces of and between the drums, an electrode insulatingly supported in spaced relation to each of the drums to establish the electrostatic heating fields through the material adhering to the surface of the drums, a high frequency oscillatory generator having its output leads connected to the respective electrodes, said drums being grounded to minimize the voltage of the drums with respect to earth and to establish parallel circuits for the respective electrodes, means for varying the relative strength of the substantially 180° out of phase electrostatic fields and means for maintaining sub-atmospheric pressures within the enclosure with circulation for removal of vapors.

5. Electrostatic heating apparatus of the character described comprising an enclosure, cylindrical drums of high electrical conductivity metal suitably journalled therein in closely spaced relation, means for rotating the drums in opposite directions, means for passing steam through the drums for the heating thereof, means to deliver the material to be heated upon the surfaces of and between the drums, an electrode inuslatingly supported in spaced relation to the drums to establish the electrostatic heating fields through the material adhering to the surface of the drums, a high frequency oscillatory generator having its output leads connected to the respective electrodes, said drums being grounded to minimize the voltage of the drums with respect to earth and to establish parallel circuits for the respective electrodes, means for varying the relative strength of the substantially 180° out of phase electrostatic fields, consisting in adjustably connecting the output leads of the oscillatory generator to the tank coil thereof and means for adjusting the drums relatively for varying their spacing relation.

6. Electrostatic heating apparatus as defined in claim 5 and provided with means for exhausting the air from the enclosure and said enclosure having an adjustable bleeder opening for air circulation.

7. Electrostatic heating apparatus of the character described comprising an enclosure, cylindrical drums of high conductivity metal suitably journalled therein in closely spaced parallel relation, means for rotating the drums reversely, means for delivering the material to be heated upon the surfaces of and between the drums, an electrode positioned in spaced relation to each of the drums to establish an electrostatic field through material adhering to the surface of the drums, a high frequency oscillatory generator having its leads connected to the respective electrodes, means for electrically grounding the drums to minimize the voltage of the drums with respect to earth and to establish parallel circuits for the respective electrodes and means for adjusting the relative spacing of the drums.

8. Electrostatic heating apparatus of the character described comprising an enclosure, means operative continuously to exhaust air from the enclosure, cylindrical drums of high conductivity metal journalled in the enclosure so as to be adjustable in their spaced relation, means for delivering the material to be heated upon the surfaces of and between the drums, driving connections for the drums, an electrode positioned in spaced relation to each of the drums to establish an electrostatic field through the material adhering to the surface of the drums, a high frequency oscillatory generator having its output leads connected to the respective electrodes and connections for electrically grounding the drums and enclosure to establish electrostatic fields substantially 180° out of phase.

9. Electrostatic heating apparatus of the character described, drums of high electric conductivity metal suitably journalled therein in closely spaced relation, means for delivering the material to be heated upon the surfaces of and between the drums, an electrode positioned in spaced relation to each of the drums to determine an electrostatic field through the material adhering to the surface of the drums, a high frequency oscillatory generator having its output leads connected to the respective electrodes and means for electrically grounding the drums to minimize the voltage of the drums with respect to earth and to establish electrostatic fields substantially 180° out of phase.

10. Electrostatic heating apparatus of the character described comprising cylindrical drums of high electrical conductivity metal suitably journalled therein in closely spaced relation, means to deliver the material to be heated upon the surfaces of and between the drums, an electrode insulatedly supported in spaced relation to each of the drums to establish an electrostatic heating field through the material adhering to the surface of the drums, a high frequency oscillatory generator having its output leads connected to the respective electrodes and said drums being grounded to minimize the voltage of the drums with respect to earth and means for varying the relative strength of the electrostatic fields thereof.

11. Electrostatic heating apparatus comprising an enclosure, electrode drums of high electrical conductivity metal suitably journalled therein with their axes parallel and having sections of their peripheral surfaces in substantially closely spaced relation, means for adjusting the spaced relation surfaces of said drums, means for rotating said drums in opposite directions, means for delivering the material to be heated to the surfaces of said drums so as to pass between said drums and form coatings upon the surfaces of said drums when said drums rotate, a separate electrode positioned in spaced relation to each of said electrode drums to determine an electrostatic field through the material adhering to the surface of said drums, said electrodes having curved surfaces substantially concentric with the periphery of the drums and adjacent thereto, means connected between said electrodes and to ground for energizing said electrodes with high frequency oscillations, means for electrically grounding the drums, whereby parallel circuits for the respective electrodes are established, means for varying the relative strength of the electrostatic fields, means for maintaining subatmosphere pressures within the enclosure, and means for heating said drums.

VERNON W. SHERMAN.

REFERENCES CITED

The following references are of record in the file of this patent:

UNITED STATES PATENTS

| Number | Name | Date |
|---|---|---|
| 2,309,303 | Crandell | Jan. 26, 1943 |
| 758,065 | Hall | Apr. 26, 1904 |
| 1,048,463 | Merrell et al. | Dec. 24, 1912 |
| 2,054,273 | Subkow | Sept. 15, 1936 |
| 2,319,174 | Wilson | May 11, 1943 |
| 997,976 | Dunham et al. | July 18, 1911 |
| 1,135,210 | Schlueter | Apr. 13, 1915 |
| 631,568 | Merrell et al. | Aug. 22, 1899 |
| 2,385,567 | Descarsin | Sept. 25, 1945 |
| 2,298,038 | Crandell | Oct. 6, 1942 |

OTHER REFERENCES

Taylor, "Heating Wood With Radio-Frequency Power," Transactions of the A. S. M. E., April 1943; pages 201–12.